Figure 1:
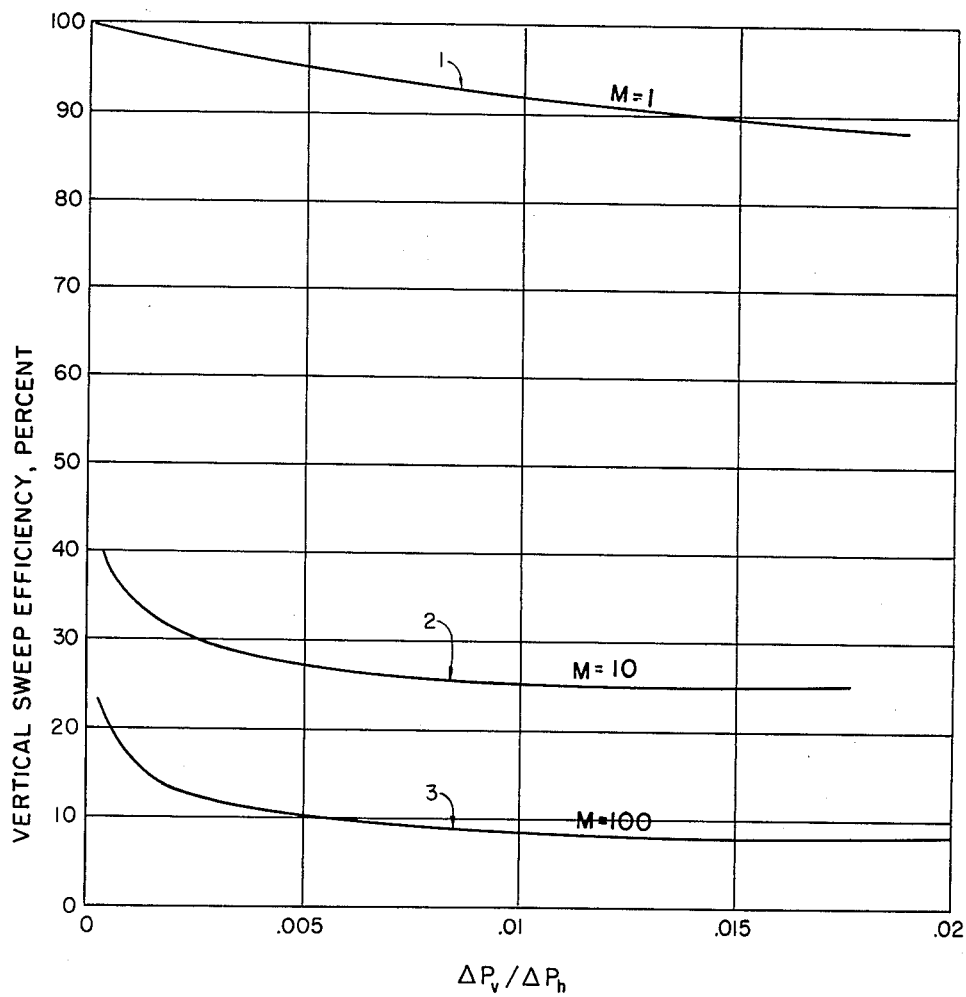

FORREST F. CRAIG JR.
HOWARD N. HALL
INVENTORS

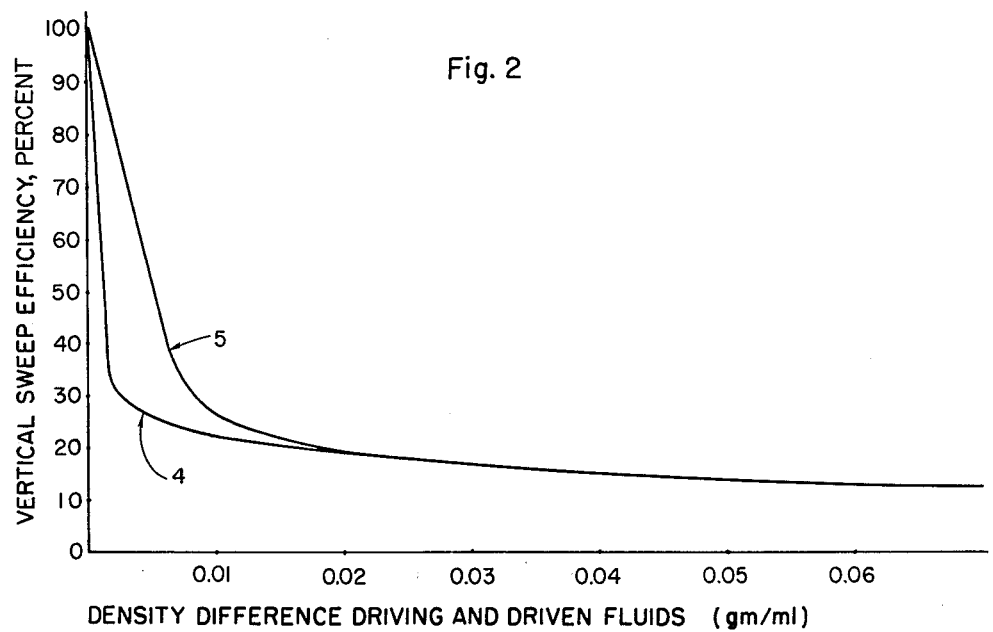
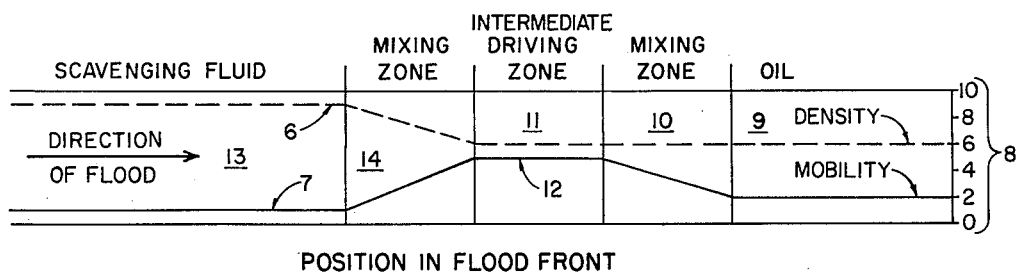

3,003,554
SECONDARY RECOVERY PROCESS WITH CONTROLLED DENSITY FLUID DRIVE

Forrest F. Craig, Jr., and Howard N. Hall, Tulsa, Okla., assignors to Pan American Petroleum Corporation, Tulsa, Okla., a corporation of Delaware
Filed Dec. 5, 1957, Ser. No. 700,879
8 Claims. (Cl. 166—9)

This invention relates to an improved process for displacing oil from a subterranean reservoir. More particularly this invention is directed to an improved secondary recovery process wherein the efficiency of oil recovery is improved by controlling the density and the mobility of displacing fluids.

The efficiency of oil recovery from subterranean reservoirs by any recovery process is a function of the ultimate recovery per barrel of oil-in-place at initiation of the process. Such efficiency depends upon three variables; viz, the vertical sweep efficiency, the horizontal sweep efficiency, and the displacement efficiency. This case is not directly concerned with horizontal sweep efficiency which pertains to the areal coverage of a driving fluid in a horizontal plane or with displacement efficiency which relates to the volume of the driven fluid actually recovered from a particular unit of a reservoir by displacement with a driving fluid. It is instead primarily directed to an improvement in vertical sweep efficiency, vertical sweep efficiency being defined and referred to herein in percent as the area of a reservoir contacted by the driving fluid at any vertical plane within the reservoir between an input well and a producing well divided by the total area of such a vertical plane between the wells.

In the past some consideration has been given to the effects of mobility ratio of and density differences between the driving and driven fluids for increasing the recovery of oil from subterranean oil reservoirs. It has generally been agreed that oil recovery from a reservoir is increased in a frontal drive such as a water flood, gas drive, or a solvent drive if the mobility ratio is low. The mobility ratio is generally considered to be the specific mobility of the driving fluid divided by the specific mobility of the driven fluid. This is expressed mathematically as follows:

$$M = \frac{\frac{K(\text{driving})}{\mu(\text{driving})}}{\frac{K(\text{driven})}{\mu(\text{driven})}}$$

where $M$ = mobility ratio
$K$ = permeability of the reservoir rock to the fluid
$\mu$ = fluid viscosity Since oil is normally substantially more viscous than the typical driving or scavening fluid; viz, water and gas, in secondary recovery operations the mobility ratio is generally high, i.e., very unfavorable for efficient displacement of oil in secondary recovery processes which have previously been employed.

Those skilled in the art have recognized that during geologic time the fluids; namely, gas, oil, and water, in reservoirs have become separated and stratified according to their densities, the lighter fluids being found in a virgin reservoir above the denser fluids. Some have reasoned that even though a secondary recovery process covers a period of time which is negligible in comparison to geologic time, there is nevertheless some stratification between the driving and driven fluid due to differences in density. This is often referred to as gravity segregation. Gravity segregation in secondary recovery is, of course, undesirable since it permits the driving fluid to bypass under or over the oil and the oil is not recovered. While some thought has been given to this problem, a secondary recovery process which adequately overcomes the adverse effects of gravity segregation has not been proposed.

It is therefore an object of this invention to provide an improved secondary or artificial recovery process. It is a more specific object of this invention to provide a process for recovering oil from a subterranean reservoir by controlling the relative densities of driving and driven fluids and the mobility ratios of driving and driven fluids. It is still a more specific object of this invention to provide an improved oil recovery process wherein oil is displaced from a reservoir by one or more intermediate driving fluids and wherein such intermediate driving fluids are displaced through the reservoir with a scavenging fluid, the density and mobility of an intermediate driving fluid being adjusted to provide a maximum vertical sweep efficiency and thus obtain maximum oil recovery. Other objects of this invention will become apparent from the following description in which reference will be made to the accompanying drawings. In these drawings:

FIGURE 1 is a series of plots of the vertical sweep efficiencies at breakthrough of the driving fluids versus the ratio of gravity to viscous forces in a typical frontal drive of a fluid in a reservoir;

FIGURE 2 is a series of plots of the vertical sweep efficiencies at breakthrough of the driving fluid versus density differences between typical driving and driven fluids in a frontal drive recovery process; and FIGURE 3 is a schematic diagram showing densities and mobilities of the oil, the intermediate driving fluid and the scavenging fluid at various positions along a flood front in a preferred embodiment of this invention.

We have found as indicated in FIGURE 1 that the vertical sweep efficiency in a secondary recovery process increases as the mobility ratio decreases and as the ratio of the differential pressure vertically to the differential pressure horizontally decreases. We have also found that in a frontal drive the vertical differential pressure/horizontal differential pressure ratio varies directly as the density difference between the driving and driven fluids, as the specific permeability of the reservoir rock, and as the formation thickness. This ratio of the gravity forces to the viscosity forces also varies inversely as the injection rate, as the viscosity of the driven fluids, and as the length of the system, i.e., the distance between the input well and the producing well. This is expressed mathematically as follows:

$$\frac{\Delta P_\text{v}}{\Delta P_\text{h}} = \frac{\Delta \rho g K H}{V \mu_0 L}$$

where $\Delta P_\text{v}$ = vertical differential pressure—gravity forces
$\Delta P_\text{h}$ = horizontal differential pressure—viscosity forces
$\Delta \rho$ = density difference between driving and driven fluid
$g$ = acceleration due to gravity
$K$ = formation permeability
$H$ = formation thickness
$V$ = linear injection rate
$\mu_0$ = viscosity of the driven fluid
$L$ = length of system Curves 1, 2, and 3 show the vertical sweep efficiency where the mobility ratios are 1, 10, and 100 respectively for driving and driven fluids having gravity/viscosity force ratios in the range 0–0.02. From these curves it can be seen that the vertical sweep efficiency increases substantially as the mobility ratio decreases. It can also be seen that with other parameters fixed, the vertical sweep efficiency at any mobility ratio varies inversely as the density difference between the driving and driven fluids.

Curve 4 of FIGURE 2 shows how the vertical sweep efficiency at breakthrough varies with the difference in density between the driving and driven fluids in a typical frontal drive with miscible fluids. It can be seen from this curve that with a density difference of greater than about 0.002 gram per milliliter the vertical sweep efficiency in such a frontal drive becomes very low but that as the density difference approaches zero the vertical sweep efficiency improves substantially. It can also be seen that by varying the injection rate in any particular system, the vertical sweep efficiency can be varied. The permeability, length of the system, thickness of the formation, and the viscosity of the oil are generally considered as fixed in any system. While these parameters may each vary over a subtsantial range from reservoir to reservoir, the combination thereof, together with practical injection rates, has been found to vary only within a rather limited range so that the density difference between the driving and driven fluids is the most important variable to control. Curve 5 shown in FIGURE 2 is a limiting condition for all practical conditions. That is, at a density difference of greater than about 0.01 gram per milliliter between the driving and driven fluids, the vertical sweep efficiency decreases under normal operating conditions to an undesirable range in any frontal drive, including both miscible and immiscible drives. It is therefore considered highly desirable that there be substantially no density difference between the driving and driven fluids, i.e., that this density difference be less than about 0.01 gram per milliliter under any driving conditions, particularly, in a miscible fluid drive. It can also be seen from these curves that as this density difference between the driving and driven fluids increases the vertical sweep efficiency becomes very low under all practical operating conditions. In the typical gas or water drive where the difference in density between the oil and the gas or the oil and the water is very great, the vertical sweep efficiency at breakthrough is generally lss than about 80 percent, typically in the range of 35-70 percent. In a miscible fluid drive the vertical sweep efficiency is generally much lower due to the higher mobility ratio. A typical vertical sweep efficiency in this process, as previously employed, is in the range 5-25 percent or lower at breakthrough of the driving fluid. The ultimate oil recovery is often higher than this and the drives are economical due to the fact that the displacement efficiency and both the vertical and horizontal sweep efficiencies increase as the drive is continued, usually long after the driving fluid breaks through to the producing well.

In view of the highly improved results obtained when the driving and driven fluids are of substantial equal density, it is an important element of this invention that the first fluid injected into the input well to displace the oil through the reservoir, i.e., the intermediate driving fluid, have a density substantially equal to the density of the oil. The density of oils found in subterranean reservoirs varies over a substantial range typically from about 0.5 to about 1 gram per milliliter or more. Due to this wide variation in oil density, it is seldom that a pure intermediate driving fluid can be found which has a density sufficiency close to the density of the oil to perform satisfactorily in this process. For this reason the intermediate driving fluid is typically compounded from two or more mutually soluble fluids. These mutually soluble fluids are also very desirably mutually soluble or miscible with the oil since the displacement efficiency of the drive has been found to be substantially higher where the driving and driven fluids are miscible. Examples of such oil-miscible fluids are acetone, propyl alcohol, liquified petroleum gas, often referred to as L.P.G., or components thereof such as butane or propane. These fluids alone normally are either lighter or heavier than the reservoir oils and, therefore, their densities are increased or decreased, i.e., matched to the oil, by the addition of another miscible liquid. Carbon dioxide, hydrogen sulfide, carbon tetrachloride, dioxane, and carbon bisulfide are typical examples of denser liquids blended with a primary solvent such as L.P.G. to increase its density. Propane and butane are examples of lighter liquids that may be blended with a denser primary solvent such as acetone to decrease its density. Other combinations which will permit accurate density control will be apparent from a consideration of the densities and solubilities given in suitable handbooks. In the preferred embodiment where the scavenging fluid is water, the intermediate driving fluid includes mixtures of acetone, propanol, or other amphipathic solvents with miscible denser liquids such as carbon tetrachloride, hydrogen sulfide, and carbon dioxide or with miscible lighter liquids such as L.P.G. or other light hydrocarbons. It will be apparent that, knowing the densities of each of these fluids, the amount of each required to produce a specified density which substantially matches the density of the oil can be obtained by mixing two or more components in the proper proportion. For example, a mixture of five parts of propanol having a density of 0.8 gram per milliliter and one part hydrogen sulfide having a density of 1.4 grams per milliliter would produce a fluid having an intermediate density of 0.9. This intermediate density driving fluid would be suitable for displacing oil having a substantially equal density.

Referring now to FIGURE 3 which shows a vertical cross-section of a portion of an oil reservoir, the oil is being displaced from an input well on the left (not shown) to an output or producing well on the right (not shown). More particularly, FIGURE 3 shows schematically a density plot 6 and a mobility plot 7 of the various fluids and fluid mixtures at various positions across a portion of a horizontal oil reservoir at a flood front containing oil, an intermediate driving fluid and a scavenging fluid. In this figure the mobility and density of a fluid or a mixture of fluids at any point in the flood front is indicated on scale 8 at the right in nondimensional numbers. It can be seen from that plot that the specific mobility of the oil in the leading oil zone 9 is very low. This low mobility is, of course, due to the relatively high viscosity of oil. An intermediate driving fluid such as a mixture of propanol and hydrogen sulfide is injected into the reservoir through the input well at the left to displace the oil bank to the right. If the density of this mixture is adjusted to the density of the reservoir oil, the density plot 6 is, of course, straight through the oil zone 9, through the oil-intermediate driving fluid mixing zone 10 and through the band 11 of pure intermediate driving fluid. Since a mixture of propanol and hydrogen sulfide is typically less viscous than most oils, the mobility of this mixture is much higher, as indicated by the crest 12 on the mobility plot 7 in the band 11 of pure intermediate driving fluid, than the mobility of the oil in the oil zone 9. Where the intermediate driving fluid is miscible with the oil it is driving, the mobilities of the two vary inversely as their viscosities. It can therefore be seen that the mobility of a fluid at any position within the mixing zone 10 varies substantially linearly from the mobility of the oil at the leading end to the mobility of the pure intermediate driving fluid at the trailing end of the mixing zone. Even if the two pure fluids are not miscible, it appears generally that the mobility within the mixing zone varies in somewhat the same manner.

The volume of the intermediate driving fluid or fluids injected into the input well is not particularly critical, i.e., any amount injected produces improved results. We have found, however, that it is generally desirable to inject into the input well a quantity of intermediate driving fluid great enough so that as it is displaced outwardly from the input well, there is always a band of substantially pure or uncontaminated intermediate driving fluid at the flood front. In a line drive this quantity of intermediate driving fluid may comprise about 1–5 percent or more of the pore volume of the reservoir which will be swept and which is originally filled with oil. In a radial drive, the amount of intermediate driving fluid injected should desirably be greater, preferably 5–10 percent of the hydrocarbon pore volume swept, or more.

This intermediate driving fluid is then displaced through the reservoir, displacing the oil ahead of it as described above, by injecting into the input well a scavenging fluid. Typical scavenging fluids are water, natural gas, air, flue gas, and the like. In the preferred embodiment the scavenging fluid is desirably water and it is desirably miscible with the last intermediate driving fluid. Preferably the intermediate driving fluid is therefore primarily an amphipathic solvent such as propanol, isopropanol, acetone, or the like, mixed with a minor amount of a denser liquid such as carbon dioxide or hydrogen sulfide, or a lighter liquid such as propane. Being miscible with the intermediate driving fluid this scavenging fluid in zone 13 forms a scavenging fluid-intermediate driving fluid mixing zone 14 in which the composition varies from substantially pure intermediate driving fluid at the leading edge to substantially pure water or other scavenging fluid at the trailing edge. This mixing zone is then displaced as a band through the reservoir by the scavenging fluid which is injected into the input well until substantially all of the oil and intermediate driving fluid have been displaced through the reservoir and produced from the output well. The reservoir is thus left full of the scavenging fluid, typically water.

Water having a density of about 1 gram per milliliter is heavier than most reservoir oils. The density plot 6 therefore rises through the mixing zone 14 as the liquid changes from substantially pure intermediate driving fluid to substantially pure water. This change in density, as indicated above, is considered undesirable in that the heavier water tends to flow under the lighter intermediate driving fluid and contact the oil in the oil bank 9 directly. Being heavier than the oil, the water and oil also tend to be segregated and stratified according to their densities, and the water flows under and bypasses the oil. We have found that this tendency toward gravity segregation is reduced and in many cases substantially eliminated whenever the mobility ratio of the water/intermediate driving fluid is relatively low, desirably less than about 1 and typically 0.1 or less. In the preferred embodiment the driving fluid, water, is generally 10–20 percent or more heavier than the fluid it is driving, the intermediate driving fluid, and, therefore, the vertical sweep efficiency tends to be low. This difference is density is, however, compensated by a favorable mobility ratio which is preferably very low, typically in the range of 0.1–0.05 or lower which as indicated by FIGURE 1 produces a vertical sweep efficiency approaching 100 percent. This favorable mobility ratio between the water bank and the intermediate driving fluid bank even with the unfavorable density relationship has been found to produce a very desirable overall vertical sweep efficiency. This applies in any frontal drive and particularly in a frontal drive in which the intermediate driving fluid is miscible with both the oil and the scavenging fluid. In such miscible or solvent drives, due to the higher displacement efficiencies, a very high overall recovery efficiency not attainable by other frontal drives or secondary recovery processes can be obtained.

It will be apparent that various substitutions and modifications of this process can be made without departing from the spirit and intent of this invention. For example, it will be apparent that by properly adjusting the density of any fluid displacing oil in a solvent drive, as herein disclosed, the vertical sweep efficiency can be improved regardless of the density difference between or mobility ratio of a scavenging fluid and the solvent. It will also be apparent that any number of intermediate driving fluids may be employed in series between the oil and the scavenging fluid. For example, a bank of oil solvent such as a mixture of L.P.G. and carbon tetrachloride, having a density substantially equal to the density of the oil may be driven by a bank of an amphipathic solvent such as propanol or a mixture of propanol or acetone and hydrogen sulfide or carbon dioxide preferably with the density adjusted to that of the fluid it is driving. This secondary solvent in such case is driven directly by the aqueous scavenging fluid or indirectly by the scavenging fluid with a tertiary solvent disposed therebetween. Such modifications should be construed to fall within the scope of the appended claims.

We claim:

1. In a process for recovering oil from a subterranean oil reservoir in which gravity segregation is a problem when said reservoir is subjected to a solvent drive operation, the steps which comprise forming an intermediate driving fluid by mixing at least two fluids of different density and mutually soluble in one another and in said oil, at least one of said fluids being lighter and at least one of said fluids being heavier than said oil, adjusting the amounts of said fluids in said intermediate driving fluid until the density difference between said driving fluid and said oil is not greater than about 0.01 gram per milliliter, thereafter injecting the resulting intermediate driving fluid of adjusted density into said reservoir through an input well and subsequently displacing said oil and said intermediate driving fluid through said reservoir toward a producing well by injecting into said reservoir through said input well a scavenging fluid having a mobility in said reservoir substantially lower than the mobility of said intermediate driving fluid.

2. The process of claim 1 in which L.P.G. is a component of said intermediate drive fluid.

3. The process of claim 2 in which said scavenging fluid is water.

4. The process of claim 1 in which said density difference is no greater than about 0.002 gram per milliliter.

5. A process for recovering oil according to claim 1 wherein said intermediate driving fluid is miscible with both said oil and said scavenging fluid.

6. A process for recovering oil according to claim 5 wherein said scavenging fluid is water.

7. A process for recovering oil according to claim 5 wherein said scavenging fluid is water and said intermediate driving fluid is a combination of an amphipathic solvent with a dense liquid selected from the group consisting of hydrogen sulfide, carbon bisulfide, carbon tetrachloride, and carbon dioxide.

8. The process of claim 5 in which said density difference is no greater than about 0.002 gram per milliliter.

References Cited in the file of this patent

UNITED STATES PATENTS 2,742,089    Morse et al. _____ Apr. 17, 1956